2,889,194
PROCESS FOR THE PREPARATION OF SODIUM BOROHYDRIDE

Albert D. McElroy and Joseph P. Nigon, Evans City, Pa., assignors to Callery Chemical Company, Pittsburgh, Pa., a corporation of Pennsylvania No Drawing. Application February 28, 1955
Serial No. 491,198

5 Claims. (Cl. 23—14)

This invention relates to a process for the preparation of sodium borohydride ($NaBH_4$) and more particularly it relates to a process in which solid non-volatile higher hydrides of boron $[(BH)_x]$ of indefinite composition are treated with sodium hydride (NaH) and hydrogen ($H_2$) in a suitable solvent to yield sodium borohydride.

In the preparation of tetraborane, pentaborane-9, pentaborane-11 and decaborane by the pyrolysis of diborane a considerable amount of solid higher hydrides is obtained having the composition designated by the formula $(BH)_x$. These solids are referred to in the literature as "yellow hydrides" or "boron hydride polymers." They are non-volatile and insoluble in practically all known solvents for other boron-containing compounds. Heretofore, these solid non-volatile hydrides were considered to be totally unreactive and were discarded as an undesirable by-product of the diborane pyrolysis process. Until now, so far as we are aware, there has not been a method developed for recovering or utilizing the boron values contained in these solid non-volatile higher hydrides.

It is an object of this invention to provide a new and improved process for treating solid non-volatile higher boron hydrides so that the boron values contained therein can be recovered in a more useful and soluble form.

Another object is to provide a new and improved process for preparing sodium borohydride by treating solid non-volatile higher boron hydrides with sodium hydride and hydrogen.

Other objects will become apparent throughout the specification and claims which follow.

This new and improved process for the conversion of solid non-volatile boron hydrides to sodium borohydride will be more fully described hereinafter and the novelty thereof will be particularly pointed out and distinctly claimed.

This invention is based upon the discovery that solid non-volatile boron hydrides which are formed as by-products in the pyrolysis of diborane can be converted to other more useful boron-containing compounds such as an alkali metal borohydride by treatment with an alkali metal hydride and hydrogen in a polyethyleneglycoldialkylether as solvent.

In one experiment, 1.0 g. of boron hydride polymer, 1.0 g. of sodium hydride and 25 ml. of ethyleneglycoldimethylether ($CH_3OC_2H_4OCH_3$) were placed in a suitable pressure reactor and pressurized to 800 p.s.i.g. with hydrogen. The reactor was stirred by rotation and the contents heated at 50° C. for 94 hours. After this time the reactor was opened and the portion of the reaction mixture soluble in the solvent was separated by filtration. The solvent was removed by evaporation and an appreciable amount of solid product remained which was identified by X-ray and conventional chemical analysis as sodium borohydride.

In another experiment, 0.87 mol of NaH, 2.0 g. of solid non-volatile boron hydride polymer, 25 ml. of ethyleneglycoldimethylether and 0.17 mol of hydrogen were placed in a pressure reactor which was rotated and heated for 94 hours at 50° C. The isolated residue was purified by treatment with liquid ammonia which upon evaporation left a white solid identified as sodium borohydride.

Other experiments indicate that this process is operative in any of the polyethyleneglycoldialkylethers (having the general formula $R(OC_2H_4)_nOR$ where R is a lower alkyl group and $n$ is a number from 1 to 4) in which sodium borohydride is soluble.

Although two specific embodiments of this invention have been described, it will be apparent to those skilled in the art that other alkali metal hydrides and solvents may be used in this process as well as other temperatures of reaction. It should therefore be understood that within the scope of the appended claims this invention may be practiced otherwise than as specifically described.

What we claim and desire to secure by United States Patents is:

1. A process for recovering the boron values contained in solid non-volatile higher boron hydrides which comprises reacting said boron hydrides with an alkali metal hydride and hydrogen under pressure at a temperature in excess of room temperature in the presence of a polyethyleneglycoldialkylether having the general formula $R(OC_2H_4)_nOR$ where R is a lower alkyl group and $n$ is a number from 1 to 4, and recovering the alkali metal borohydride formed.

2. A process for preparing sodium borohydride which comprises reacting solid non-volatile higher boron hydrides with sodium hydride and hydrogen under pressure at a temperature of about 50° C. in the presence of a polyethyleneglycoldialkylether having the general formula $R(OC_2H_4)_nOR$ where R is a lower alkyl group and $n$ is a number from 1 to 4 and recovering the sodium borohydride thus formed.

3. A process for preparing sodium borohydride which comprises reacting solid non-volatile higher boron hydrides with sodium hydride and hydrogen under pressure at a temperature of about 50° C. in the presence of ethyleneglycoldimethylether ($CH_3OC_2H_4OCH_3$) and recovering the sodium borohydride thus formed.

4. A process according to claim 3 in which the reaction is carried out at a pressure of about 800 p.s.i.g.

5. A process according to claim 3 which is carried out in suspension in a substantial quantity of ethyleneglycoldimethylether.

No references cited.